(12) United States Patent
Chen et al.

(10) Patent No.: US 8,112,172 B2
(45) Date of Patent: Feb. 7, 2012

(54) METHOD AND SYSTEM FOR GASH PARAMETER EXTRACTION OF A CUTTING TOOL

(75) Inventors: Tian Chen, Shanghai (CN); Kevin George Harding, Niskayuna, NY (US); Steven Robert Hayashi, Niskayuna, NY (US); Xiaoming Du, Shanghai (CN); Howard Paul Weaver, Mason, OH (US); James Allen Baird, Amelia, OH (US); Xinjue Zou, Shanghai (CN); Kevin William Meyer, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 461 days.

(21) Appl. No.: 12/431,999

(22) Filed: Apr. 29, 2009

(65) Prior Publication Data

US 2010/0280649 A1    Nov. 4, 2010

(51) Int. Cl.
*G06F 19/00* (2011.01)
*G01B 5/20* (2006.01)

(52) U.S. Cl. .......... 700/175; 700/195; 702/167
(58) Field of Classification Search .......... 700/175, 700/195; 702/167
See application file for complete search history.

(56) References Cited

U.S. PATENT DOCUMENTS

| | | |
|---|---|---|
| 3,692,414 A | 9/1972 | Hosterman et al. |
| 3,710,128 A | 1/1973 | Kubisiak |
| 4,403,860 A | 9/1983 | Pryor |
| 4,583,854 A | 4/1986 | Lozar |
| 4,736,247 A | 4/1988 | Graham et al. |
| 4,745,290 A | 5/1988 | Frankel et al. |
| 4,966,460 A | 10/1990 | Kahley |
| 5,477,371 A | 12/1995 | Shafir |
| 5,568,260 A | 10/1996 | Schneiter |
| 5,570,186 A | 10/1996 | Satzger et al. |
| 5,708,279 A | 1/1998 | Cheng |
| 5,846,081 A | 12/1998 | Bushway |

(Continued)

FOREIGN PATENT DOCUMENTS

EP    1580521 A    9/2005

(Continued)

OTHER PUBLICATIONS

G. F. Dalgleish et al., "Laser-Based Inspection of Cutting tools for Advanced Manufacturing Systems," IEE 1994, Conference Publication No. 398, Oct. 3-5, 1994.

(Continued)

*Primary Examiner* — Ryan Jarrett
(74) *Attorney, Agent, or Firm* — Penny A. Clarke (57) ABSTRACT

A method for extracting gash parameters of a cutting tool, comprises positioning the cutting tool on a moveable stage, scanning two or more gash sections of the cutting tool to generate two or more gash section scanning point clouds, indexing multiple points of the gash section scanning point clouds, detecting multiple gash features using the indexed gash section scanning point clouds, projecting multiple point clouds of the gash features of the indexed gash section scanning point clouds to form one or more projected gash feature point clouds, identifying one or more types of the one or more projected gash feature point clouds, segmenting the one or more projected gash feature point clouds based on the type identification, and extracting one or more gash parameters based on the segmentation of the one or more projected gash feature point clouds. A system for extracting the parameters is also presented.

20 Claims, 11 Drawing Sheets

U.S. PATENT DOCUMENTS

| | | | |
|---|---|---|---|
| 6,788,807 | B1 | 9/2004 | Norita et al. |
| 6,927,863 | B2 | 8/2005 | Gurny |
| 7,027,145 | B2 | 4/2006 | Segall et al. |
| 7,269,471 | B2 | 9/2007 | Kadono |
| 7,577,491 | B2 * | 8/2009 | Chen et al. .................. 700/175 |
| 7,596,468 | B2 * | 9/2009 | Chang et al. .................. 702/167 |
| 7,768,655 | B2 * | 8/2010 | Hayashi et al. ............... 356/601 |
| 7,876,454 | B2 * | 1/2011 | Du et al. ........................ 356/601 |
| 7,924,439 | B2 * | 4/2011 | Chen et al. .................... 356/601 |
| 2002/0154396 | A1 | 10/2002 | Overbeck |
| 2003/0171840 | A1 * | 9/2003 | Haupt ............................. 700/175 |
| 2004/0263863 | A1 | 12/2004 | Rogers et al. |
| 2007/1124015 | | 5/2007 | Chen et al. |
| 2008/0148590 | A1 | 6/2008 | Hayashi et al. |
| 2009/0067704 | A1 | 3/2009 | Du et al. |

FOREIGN PATENT DOCUMENTS

| | | | |
|---|---|---|---|
| EP | 1797992 | A1 | 6/2007 |
| JP | 5215527 | A | 8/1983 |
| JP | 5329751 | A | 12/1993 |
| JP | 2000293551 | A | 10/2000 |
| JP | 2008196989 | A1 | 8/2008 |

OTHER PUBLICATIONS

X. Li et al., "Machine-vision-based surface finish inspection for cutting tool replacement in production," International Journal of Production Research, vol. 42, No. 11, 2004 Taylor & Francis Group, pp. 2279-2287.

X. Yan et al., "Extraction and Optimisation of Cutting Conditions for 2 ½-axis Milling," International Journal, Advanced Manufacturing Technology, 2000 Springer-Verlag London Limited, vol. 16, No. 10, pp. 695-699.

PCT/US2007/085994 Search Report dated Mar. 25, 2008.
EP1580521 Abstract, Sep. 28, 2005.
JP2000293551 Abstract, Oct. 20, 2000.
JP5215527 Abstract, Aug. 24, 1993.
JP5329751 Abstract, Dec. 14, 1993.

* cited by examiner

METHOD AND SYSTEM FOR GASH PARAMETER EXTRACTION OF A CUTTING TOOL

BACKGROUND

This invention relates generally to methods and systems for parameter extraction of cutting tools. More particularly, this invention relates to methods and systems for gash parameter extraction of cutting tools.

Various types of cutting tools are known and used for machining objects, such as engine blades. The cutting tools have associated parameters, such as gash parameters, to define shapes and profiles thereof. Typically, the gash parameters of the cutting tools are correlated to chip flow and performance of the machined objects. Accordingly, inspection of the gash parameters in gash features of the cutting tools is required from time-to-time to ensure a smooth chip flow and performance of the cutting tools. In general, the gash parameters associated with the gash features of the cutting tools are estimated and compared to desired values for determining the cutting performance and ensuring a smooth chip flow of the cutting tools.

Different existing parameter extraction methods for the cutting tools are employed to determine the parameters of such cutting tools. However, existing parameter methods are time-consuming, relatively expensive and are less accurate than desired. Typically, since the gash features of the cutting tools are generally deep and/or steep, existing parameter methods may not retrieve all gash feature data.

Therefore, there is a need for a new and improved method and system for extraction of gash parameters of cutting tools.

BRIEF DESCRIPTION

A method for extracting gash parameters of a cutting tool is provided. The method comprises positioning the cutting tool on a moveable stage, scanning two or more gash sections of the cutting tool to generate two or more gash section scanning point clouds, indexing multiple points of the two or more gash section scanning point clouds, detecting multiple gash features using the two or more indexed gash section scanning point clouds, projecting multiple point clouds of the gash features of the two or more indexed gash section scanning point clouds to form one or more projected gash feature point clouds, identifying one or more types of the one or more projected gash feature point clouds, segmenting the one or more projected gash feature point clouds based on the type identification, and extracting one or more gash parameters based on the segmentation of the one or more projected gash feature point clouds.

Another embodiment of the invention further provides a system for extracting gash parameters of a cutting tool. The system comprises a stage configured to position the cutting tool, a range sensor configured to scan the cutting tool, and a controller. The controller is configured to control the range sensor to scan two or more gash sections of the cutting tool to generate two or more gash section scanning point clouds, to index multiple points of the two or more gash section scanning point clouds, to detect multiple gash features using the two or more indexed gash section scanning point clouds, to project multiple point clouds of the gash features of the two or more indexed gash section canning point clouds to form one or more projected gash feature point clouds, to identify one or more types of the one or more projected gash feature point clouds, to segment the one or more projected gash feature point clouds based on the type identification, and to extract one or more gash parameters based on the segmentation of the one or more projected gash feature point clouds.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

Embodiments of the present disclosure are described herein with reference to the accompanying drawings. In the subsequent description, well-known functions or constructions are not described in detail to avoid obscuring the disclosure in unnecessary detail.

Figure 1:
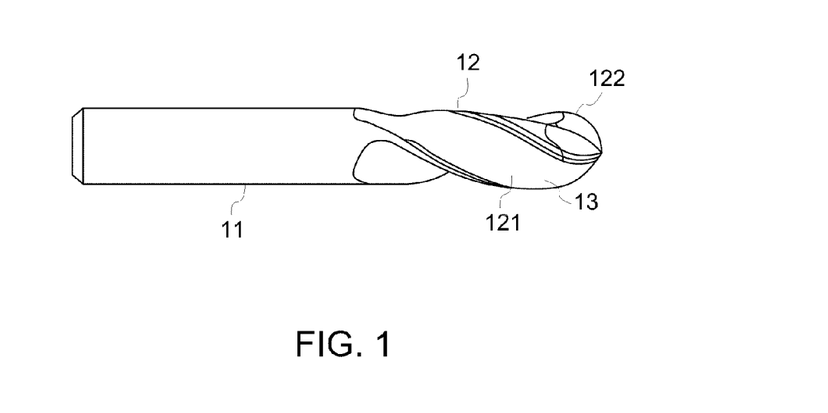
FIG. 1 is a perspective view of an example cutting tool.

In embodiments of the invention, parameters of different types of cutting tools, such as ball end mills, flat end mills, drills and reamers may be extracted. Referring to FIG. 1, a cutting tool 10, such as a ball end mill is illustrated. It should be noted that the invention is not limited to any particular type of cutting tools. Rather, the example depicted in FIG. 1 is merely illustrative. The illustrated cutting tool 10 comprises a shank 11 and a cylindrical cutting body 12. The cutting body 12 comprises a side portion 121 and a tip 122. In the illustrated example, the tip 122 comprises a rounded tip. For other cutting tools, the tip 122 may comprise other shapes, such as a flat tip when the cutting tool 10 comprises a flat end mill.

In the illustrated example, the cutting body 12 comprises multiple cutting edges and multiple flutes 13 based on a desired profile of machined parts. In one example, a two-flute mill may be employed for cutting slots or grooves. A four-flute mill may be used for a surface milling operation. The cutting tool 10 has a number of parameters associated with the cutting body 12. Non-limiting examples of the parameters associated with the cutting body 12 comprise flute spacing, an axial primary relief angle, a radial primary relief angle, a radial rake angle, concentricity, a core diameter, an axial rake angle, a helix angle, an axial gash angle, a bottom gash angle, a gash walk angle, a gash end width, and an end gash radius.

Figure 2:
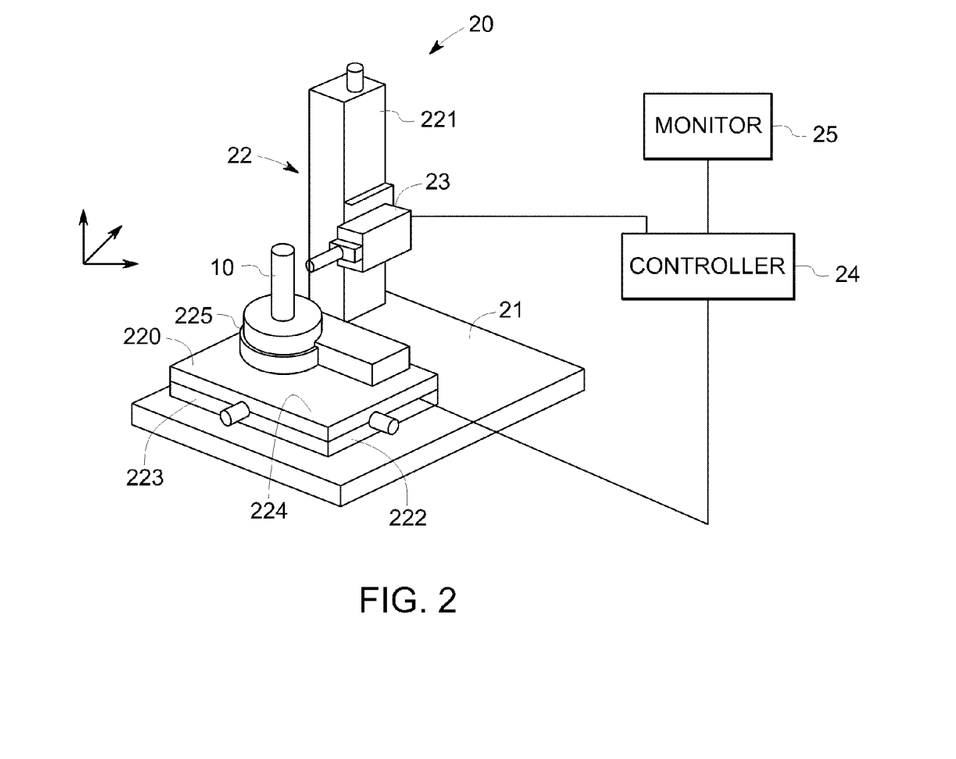
FIG. 2 is a schematic diagram of a measurement system for extracting parameters of the cutting tool in accordance with one embodiment of the invention.

FIG. 2 is a schematic diagram of a measurement system 20 for extracting the parameters of the cutting tool 10 in accordance with one embodiment of the invention. As illustrated in FIG. 2, the measurement system 20 comprises a base 21, a stage 22, a range sensor 23, and a controller 24. In the illustrated embodiment, the stage 22 comprises a first stage 220 and a second stage 221. The first stage 220 is moveably disposed on the base 21 and comprises a positioning element 222 comprising a bottom element 223 and an upper element 224 stacked together. In one embodiment, the bottom element 223 and the upper element 224 may move along an X-axis and a Y-axis relative to the base 21, respectively. Additionally, the first stage 220 may further comprise a rotatable element 225 rotatably disposed on the upper element 224 for holding the cutting tool 10. Accordingly, the cutting tool 10 may move along the X-Y-axis and rotate about a Z-axis relative to the base 21 with the linear movement of the positioning element 222 and rotation of the rotatable element 225.

In one non-limiting example of the invention, the first stage 220 may move along the X-axis within a range of approximately zero millimeters to approximately fifty millimeters with a resolution of approximately 0.1 micrometers, and may move along the Y-axis within a range of approximately zero millimeters to approximately one hundred millimeters with a resolution of approximately 0.1 micrometers. In other embodiments, the first stage 220 may move along the X-axis and/or the Y-axis within other suitable ranges having any suitable resolution. Additionally, the rotatable element 225 may rotate approximately 360 degree with a resolution of approximately 0.0001 degrees. Alternatively, the rotatable element 225 may rotate within other suitable ranges with other suitable resolutions.

In the illustrated embodiment, the second stage 221 is fixedly disposed on the base 21 to moveably hold the range sensor 23 and adjacent to the first stage 220. In one example, the range sensor 23 may move on the second stage 221 along the Z-axis. In more particular examples, the range sensor 23 may move along the Z-axis within a range of approximately zero millimeters to approximately 250 millimeters with a resolution of approximately 0.1 micrometers. In other embodiments, the range sensor 23 may move along the Z-axis within other suitable ranges and with other suitable resolutions.

In certain embodiments, the range sensor 23 may also move on the second stage 221 along the X-axis and Y-axis within a range and with a resolution substantially similar to these of first stage 220. In other embodiments, the second stage 221 may be moveably disposed on the base 21. Accordingly, in embodiments of the invention, the controller 24 may control the first stage 220 and the second stage 221 to cooperate to position the range sensor 23 at variable distances from the cutting tool 10 to measure the points on the cutting tool 10.

In the illustrated embodiment, the controller 24 comprises at least one of a computer, a database, and/or a processor to control the movement of the stage 22 and the range sensor 23, and to store and analyze the measured data points from the range sensor 23. It should be noted that the present invention is not limited to any particular computer, database or processor for performing the processing tasks of the invention. The term "computer", as that term is used herein, is intended to denote any machine capable of performing the calculations, or computations, necessary to perform the tasks of the invention. The term "computer" is intended to denote any machine that is capable of accepting a structured input and of processing the input in accordance with prescribed rules to produce an output. It should also be noted that the phrase "configured to" as used herein means that the computer is equipped with a combination of hardware and software for performing the tasks of the invention, as will be understood by those skilled in the art. Additionally, the measurement system 10 may further comprise a monitor 25, such as a LCD to display data.

Figure 3:
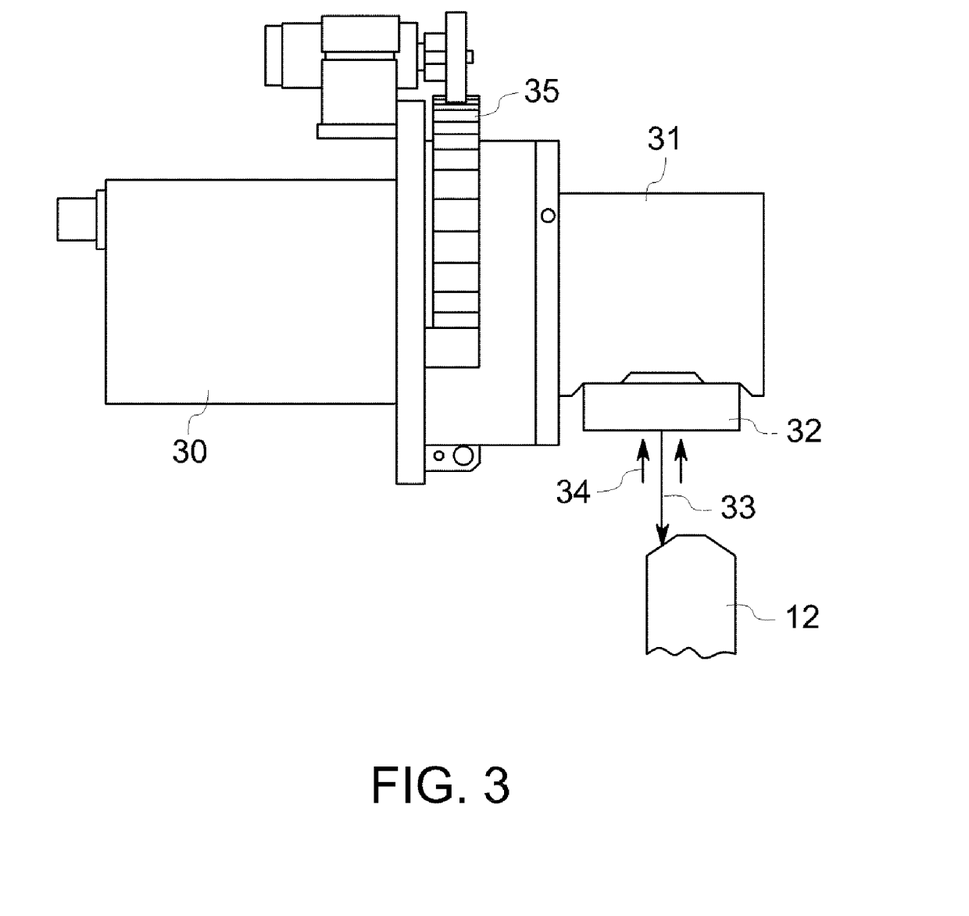
FIG. 3 is a schematic diagram of a range sensor of the measurement system in FIG. 2.

FIG. 3 illustrates a schematic diagram of an example range sensor 23. In the illustrated example, the range sensor 23 comprises an optical sensor 30 and a periscope 31 coupled to the optical sensor 30. The optical sensor 30 comprises a conoscopic sensor, such as the Optimet Smart Probe described in U.S. Pat. No. 5,953,137. The periscope 31 further comprises a lens 32. Alternatively, the optical sensor 30 may be another suitable ranging sensor.

In the illustrated embodiment, a light source (not shown) generates and directs a beam of light 33, such as a laser with a wavelength of 670 nm on a point of the cutting tool 10 after the light 33 passes through the optical sensor 30 and the periscope 31 in turn. Then, a beam of reflected light 34 is generated because of diffusion of the light 33 on the point of the cutting tool 10. The diffused light 34 passes through the periscope 31 and is detected by the optical sensor 30. Subsequently, the controller 24 (shown in FIG. 2) retrieves a distance of the point on the cutting tool 10 from the optical sensor 30 and extracts the parameters of the point by analyzing information in the detected light 34, which is known to one skilled in the art. In one or more embodiments of the invention, with the rotation of the cutting tool 10, the optical sensor 30 may detect diffused light from different points on the cutting tool 10 so that the controller 24 extracts the parameters of the cutting tool 10.

In one embodiment, the controller 24 may determine the distance with an accuracy of approximately ±1.5 microns based on the information in the detected lights by the range sensor 23. In other embodiments, the controller 24 may determine the distance with other suitable accuracy. In the illustrated embodiment, the incident light 33 has a frequency of up to approximately 3000 kilohertz. Alternatively, the incidence light 33 may have another suitable frequency.

For the arrangement illustrated in FIG. 3, the range sensor 23 further comprises a rotation mechanism 35 coupled to the periscope 31. In one embodiment, the controller 24 may control the rotation mechanism 35 to rotate the periscope 31 within a range of approximately zero degree to approximately ninety degree, or other suitable ranges. Thus, in some embodiments, the rotation mechanism 35 rotates the periscope 31 to enable the lens 32 to align with the points on the side portion 121 or the tip 122 (shown in FIG. 1) of the cutting body 12. In certain embodiments, the optical sensor 30 may also be rotatable.

Accordingly, as illustrated in FIGS. 1-3, when detecting gash parameters of the cutting tool 10, the controller 24 first controls the range sensor 23 and the first stage 220 holding the cutting tool 10 to move cooperatively so that the lens 32 aims at a desired gash section (not labeled) of the side portion 121 of the cutting body 12 with an appropriate distance therebetween. Then, the measurement system 20 rotates the cutting tool 10 while the light 33 scans the desired gash section with the rotation of the cutting tool 10. Meanwhile, the range sensor 23 detects the detected light 34 diffused from the desired gash section and outputs the detected information in the light 34 to the controller 24 for analyzing to retrieve a gash section scanning point cloud of the cutting tool 10. Similarly, more than one gash section scanning point cloud may be retrieved from more than one respective gash section. In certain applications, the gash section scanning point cloud may be retrieved from a whole or a partial gash section of the cutting tool 10.

In some embodiments, the retrieved gash section scanning point clouds may be as accurate as desired for gash parameter extraction. However, in certain applications, the retrieved gash section scanning point clouds may not be as accurate as desired due to the complex geometry of the gash sections of the cutting body 12 and limited working range of the range sensor 23. Accordingly, in non-limiting examples, prior to retrieval of the gash section scanning point clouds, the measurement system 20 may perform one or more tip scans of the tip 122 to obtain information, such as shapes, of gash features of the cutting tool 10 for facilitating the subsequent scans of the gash sections so as to improve the quality of the gash section scanning point clouds.

Figure 4A:
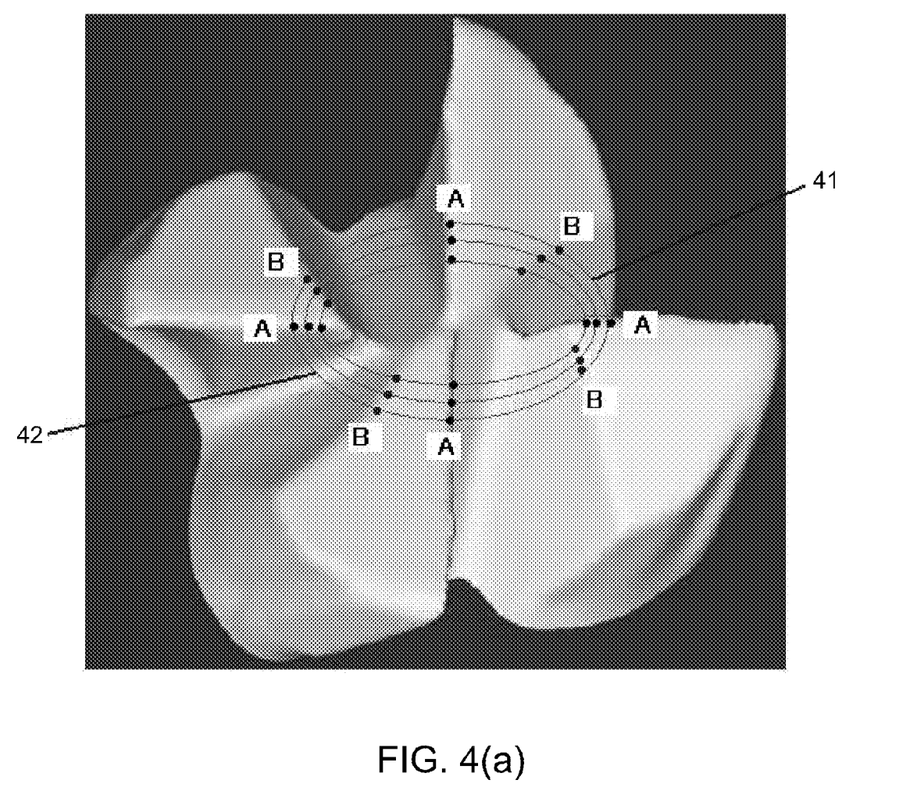
FIGS. 4(a)-4(b) are a schematic diagram of a tip and multiple tip scanning point clouds, and a schematic side view of the multiple tip scanning point clouds of an example cutting tool.
Figure 4B:
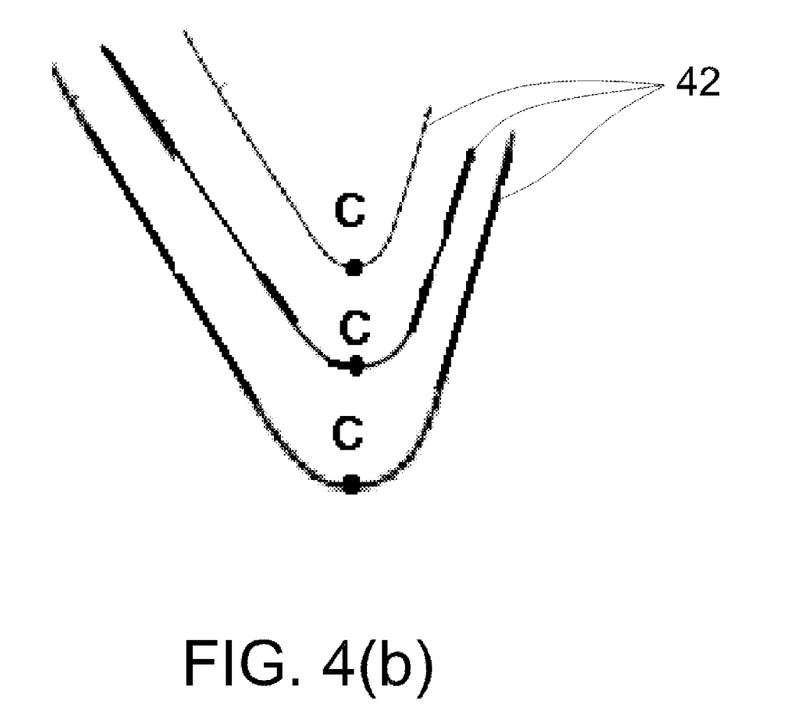

FIGS. 4(*a*)-4(*b*) illustrate a schematic diagram of a tip (not labeled) and multiple tip scanning point clouds 41, and a schematic diagram of the tip scanning point clouds 41 of an example cutting tool. It should be noted that the tip of cutting tool and the tip scanning point clouds 41 are merely illustrative for facilitating illustration of the tip scanning point clouds therefrom. In certain applications, other types of cutting tools may be illustrated. In other applications, one tip scanning point cloud may be used for obtaining information of gash features.

As depicted in FIG. 4(*a*), the tip scanning point clouds 41 are retrieved from the tip of the cutting tool. It can be seen that portions 42 of the tip scanning point clouds 41 corresponding to the respective gash features (not labeled) of the cutting tool are below other portions (not labeled) of the tip scanning point clouds 41. That is, the variance of the Z coordinate values of end points A and B on the portions 42 is large relative to other points on other portions.

In addition, as depicted in FIG. 4(*b*), the Z coordinate values of the points on the tip scanning point clouds 41 can be calculated to determine the position of respective lowest points C thereon. Accordingly, after the tip scanning point clouds are retrieved, the controller 24 may detect the Z coordinate values of the points on the respective tip scanning point clouds to determine the position of the end points A and B, and the lowest points C. Subsequently, based on relationship of the end points A, B, and/or the lowest points C, the information, such as the shapes, of the respective gash features may be estimated. For example, the end points A and B of the gash features are determined. Based on the relationship of the end points A, the shapes of surfaces (not labeled) having the points A may be estimated as substantially linear planes.

Accordingly, the information of the gash features of the cutting tool obtained from one or more tip scanning point clouds may facilitate the subsequent scans of the gash sections to retrieve the desired points and avoid missing some points so as to improve the quality of the gash section scanning point clouds.

Figure 5:
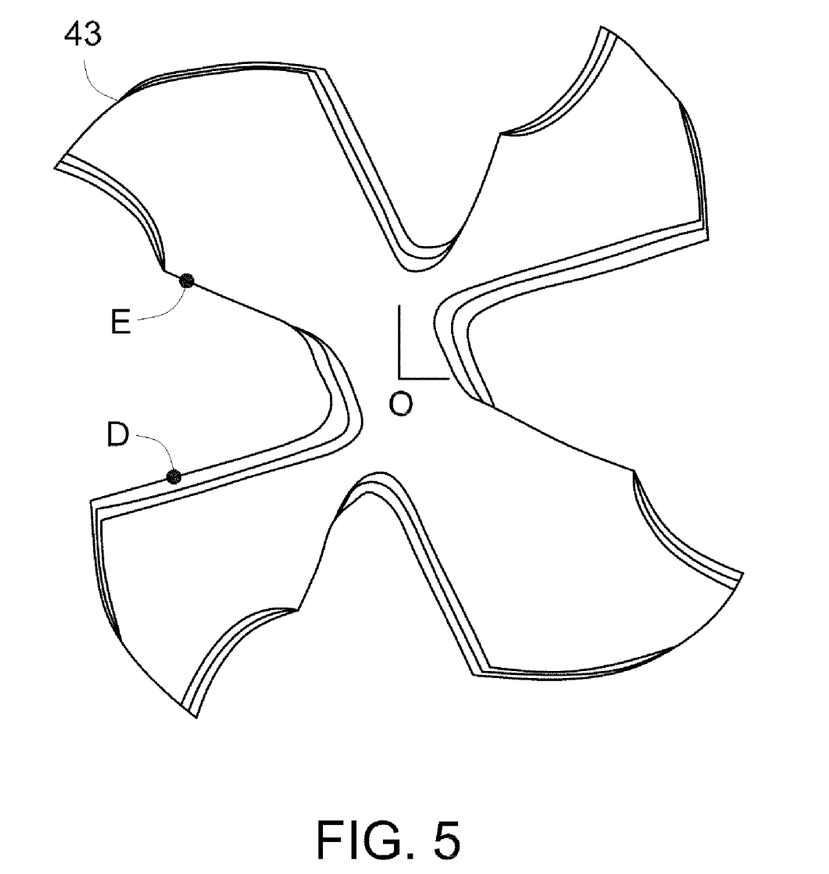
FIG. 5 is a schematic diagram of multiple example gash section scanning point clouds of a cutting tool.

FIG. 5 illustrates a schematic diagram of multiple example gash section scanning point clouds 43 of a cutting tool (not shown). In some examples, the example gash section scanning point clouds may be scanned based on the information obtained from the tip scan(s). In certain examples, the tip scans of the cutting tool may not be employed.

In some applications, before extracting the gash parameters based on the gash section scanning point clouds, the gash section scanning point clouds may be preprocessed in the controller 24 so as to improve the quality thereof. Before preprocessing, the gash section scanning point clouds may be transformed to the X-Y plane of a Cartesian coordinate system for the preprocessing.

Figure 6:
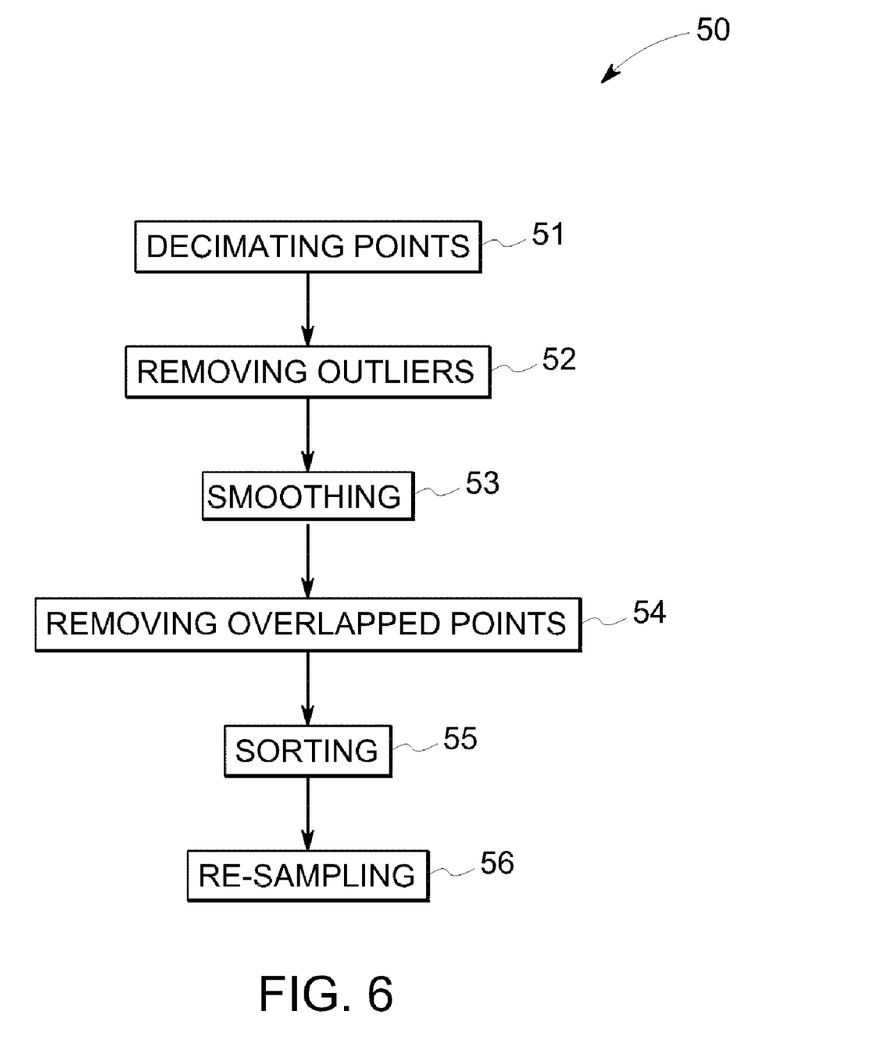
FIG. 6 is a flowchart for preprocessing the example gash section scanning point clouds.

FIG. 6 illustrates a flowchart 50 for preprocessing one or more gash section scanning point clouds. It should be noted that the sequence of steps 51-54 is only illustrative and may be varied. In some examples, one or more of the steps in the flowchart 50 may be omitted.

In the illustrated example, preprocessing one gash section scanning point cloud is taken as an example. In step 51 of the illustrated example, the gash section scanning point cloud is decimated to remove redundant points therefrom using a Quadrant Tree (Quad tree) Structure, so that the points on the gash section scanning point cloud may be partitioned and distributed relatively uniformly after decimation. In one non-limiting example, the distance (sample distance) between two adjacent points on the gash section scanning point cloud after decimation may be predetermined, so that the point cloud may be decimated based on the sample distance.

In some applications, the gash section scanning point cloud may have outliers, which may include a cluster of points whose size is smaller than a threshold cluster size and whose distance to neighboring points may exceed a threshold distance. In certain examples, the neighboring points of the outliers may be detected by using a K-dimensional tree structure to analyze the point cloud. Thus, in step 52 of the illustrated example, the outliers on the point cloud are determined and removed.

In certain applications, although the redundant points and/or the outliers on the point cloud are removed in steps 51 and 52, some points may be still distributed unevenly so that the points may not be suitable for the subsequent gash parameter extraction. Thus, in step 53 of the illustrated example, the gash section scanning point cloud is smoothed, for example by employing a Gaussian smoothing filter. In some examples, step 53 may be performed prior to or in the absence of steps 51 and/or 52.

Additionally, the point cloud may include some overlapping points having the same normal direction. Accordingly, the normal and curvature of every point on the gash section scanning point cloud may be estimated, for example using a Principle Component Analysis (PCA) method. If the distance between a point and one of its neighboring points is below a first threshold value, and an angle between the normals of the point and the neighboring points is below a second threshold value, the point and the neighboring point may be regarded as overlapping points. The first and second threshold values may be predetermined, and the neighboring points of one point may be determined, for example using a K-dimensional tree structure to analyze the point cloud. Accordingly, in step 54 of the illustrated example, overlapping points in normal directions are removed.

After being preprocessed in one or more of steps 51-54, the points on the gash section scanning point cloud may be sorted in step 55, and connected to form a polygon loop, so that a preprocessed gash section scanning point cloud may be obtained. In some embodiments, after sorting, the preprocessed gash section scanning point cloud may be re-sampled uniformly in step 56 so that a certain number of points are sampled to refine the preprocessed gash section scanning point cloud. Similarly, more than one gash section scanning point cloud may also be preprocessed. In certain examples, the preprocessing of the gash section scanning point cloud(s) may not be employed.

In other applications, after preprocessing, the controller 24 may index each point within the respective gash section scanning point clouds, so that each of these points has an index and may be positioned based on the corresponding index. In certain applications, the indexing may or may not be employed based on the gash section scanning point clouds without preprocessing.

When indexing the points on one preprocessed gash section scanning point cloud, an initial starting point is indexed as Point[0]. In some examples, if located at relief regions or around feature points, such as cutting edge points, primary relief points, or secondary clearance points, on the gash section scanning point cloud, the position of the initial starting point may be adjusted to avoid being located at the relief regions or around the feature points.

Generally, different cutting tools may have different working modes, such as right cutting and left cutting modes so that the indexing direction of a point cloud may be counterclockwise or clockwise. In one non-limiting example, the indexing direction of the preprocessed gash section scanning point cloud point cloud is counterclockwise. Accordingly, in the illustrated example shown in FIG. 5, if the indices of a point D and a point E are Point[d] and Point[e] respectively, the numeral "d" is larger than the numeral "e". If the numeral "d" is smaller than the numeral "e", the indexing of the points may be performed again according to the counterclockwise indexing direction. Alternatively, in other applications, the indexing direction may be clockwise.

Figure 7:
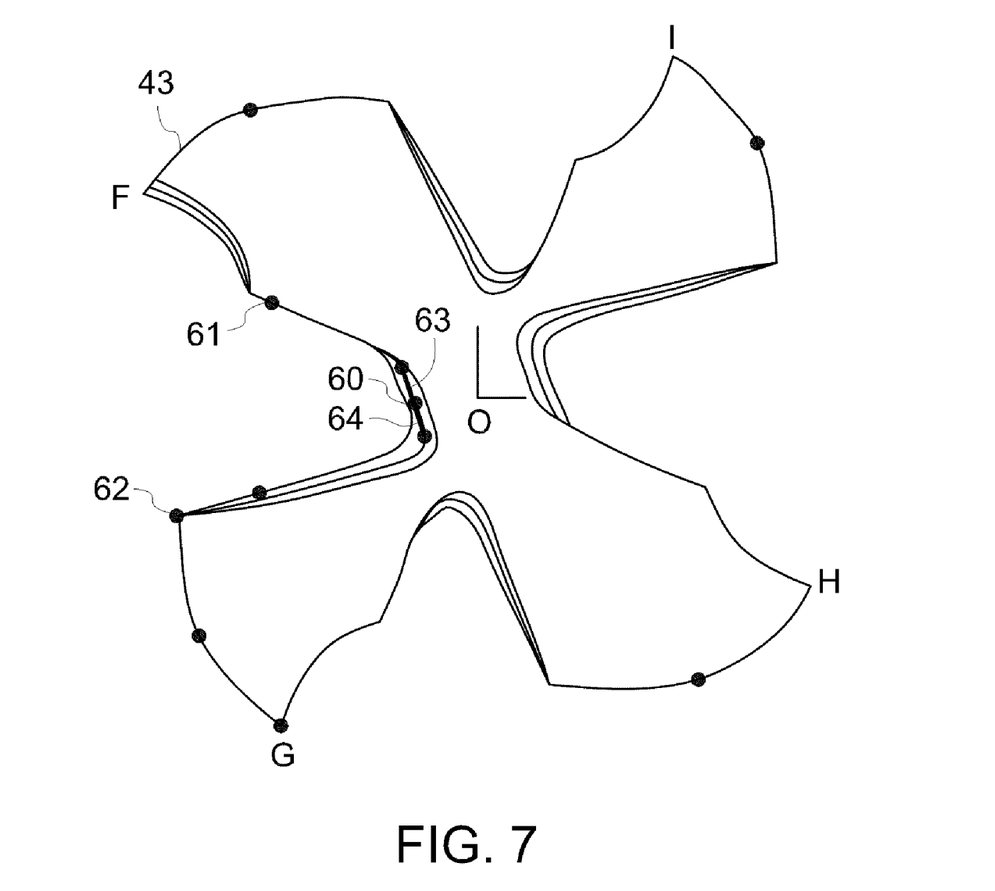
FIG. 7 is a schematic diagram illustrating detection of gash features of the example gash section scanning point clouds.

After indexing the points, the gash features on the respective gash section scanning point clouds 43 may be detected for gash parameter extraction. FIG. 7 illustrates a schematic diagram showing detection of the gash features of the example gash section scanning point clouds. For the ease of illustration, the detection of the gash features of one of the gash section scanning point clouds 43 is taken as an example.

As depicted in FIG. 7, the controller 24 may first analyze the gash section scanning point cloud 43 to detect the cutting edge feature points F, G, H, I so as to segment the gash section scanning point cloud 43 into four segments. In other applications, other feature points including, but not limited to primary relief feature points, may be used for performing segmentation of the gash section scanning point cloud. In non-limiting examples, the segmentation of the gash section scanning point cloud may be performed to make each segment include one gash feature.

In certain embodiments, the cutting edge and/or primary relief feature points on the gash section scanning point cloud may be detected by using, for example convex hull analysis, or techniques described in a Non-provisional application Ser. No. 12/419,051, filed Apr. 6, 2009, which has the same assignee as this application and the contents of which are hereby incorporated by reference.

As illustrated in FIG. 7, the detection of one gash feature of one segment of the gash section scanning point clouds 43 is selected as an example. A closest point 60 having the shortest distance from a central point O may be positioned on the segment, so that the position of the gash feature is roughly determined. Subsequently, the controller 24 analyzes the closest point 60 as well as points around the closest point 60 to detect two end points 61, 62 of the gash feature. As depicted in FIG. 7, during detection of the end points 61, 62 of the segment, the closest point 60 is selected as a beginning point. A point set (not shown), such as a set of successive twenty points, is first selected behind (first subset) and in front of (second subset) the beginning point to generate a first (real) line 63 and a second (front) line 64 on the segment by connecting the beginning point and the distal points of two subsets respectively or by using, for example the Least Squares Method.

Secondly, the controller 24 calculates an outer angle from the first line 63 and the second line 64 to determine whether the outer angle therebetween is larger than a threshold value, such as 195 degrees. The term of "outer angle" may indicate that an angle faces outside of an area enclosed by one section scanning point cloud. In some applications, the outer angle is below the threshold value, and the controller 24 continues to analyze the points at each side of the beginning point 60 in turn until the desired points, which may be the end points 61, 62, are detected. That is, an outer angle of two lines (not shown) formed in front of and behind each of the end points 61, 62 is larger than the threshold value. In certain applications, instead of forming two lines at two sides of each closest point, two lines may be first formed at two sides of points located in front of and behind each closest point for detecting the end points of each gash feature.

In this manner, the gash feature may be determined. Thus, the gash features of one or more of the gash section scanning point clouds 43 may be detected. In certain applications, the point set may include less than or more than twenty points. The threshold value may be experimentally determined.

Figure 8:
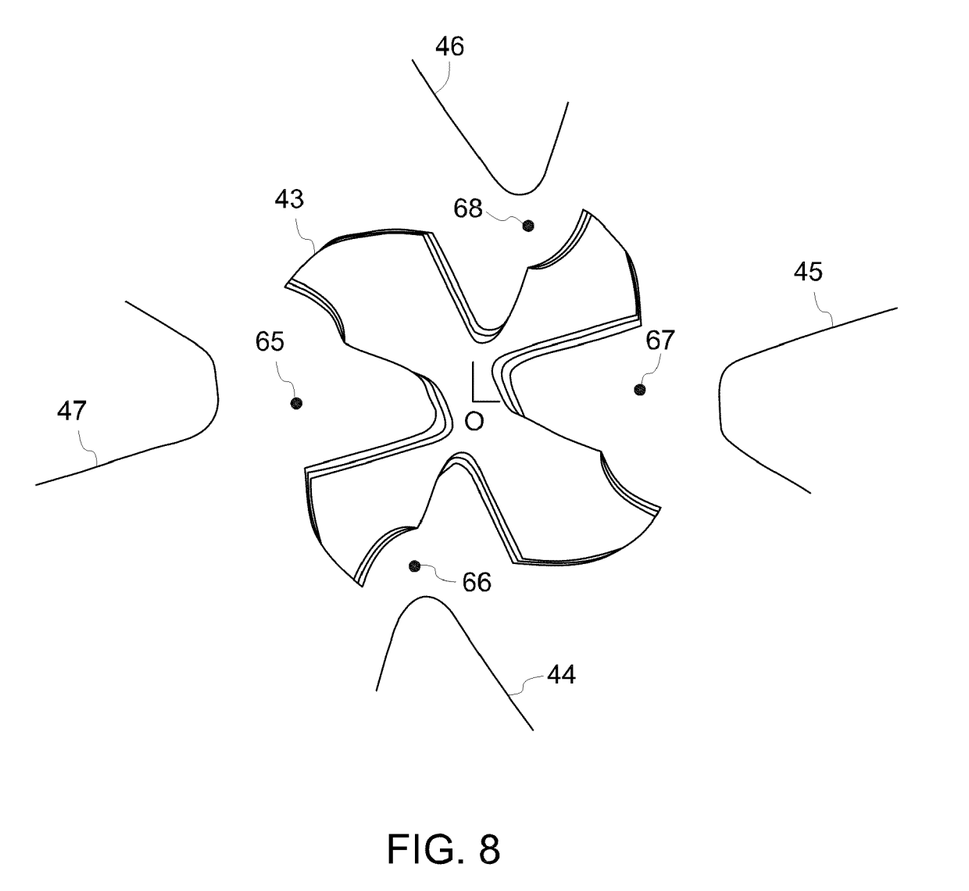
FIG. 8 is a schematic diagram illustrating projections of the example gash section scanning point clouds.

In some embodiments, after the desired gash features are determined, the controller 24 analyzes the gash feature point clouds (not labeled) of the same segment(s) of the gash section scanning point clouds 43 to detect one or more desired projection lines. Along one of the projection lines, the corresponding gash feature point clouds may be projected into one gash feature point cloud for facilitating extraction of the gash parameters. In one non-limiting example, as illustrated in FIG. 8, projection lines, as indicated by points 65-68, of the gash feature point clouds in the respective segments are detected, for example, by rotating and projecting the corresponding gash feature points clouds, so that the corresponding gash feature points clouds in each segment are projected into one gash feature point cloud 44, 45, 46, or 47. In non-limiting examples, each of the projection lines may be rotated to be parallel to an axial line, as indicated by the central point O, of the cutting tool, so as to facilitate subsequent calculation of the gash parameters.

After the gash feature point clouds are projected along the respective projection lines, the controller 24 may first determine the types of the gash features based on the respective projected gash feature point clouds. In non-limiting examples, two types of gash features may be determined. For these examples, the first type of gash feature includes two side planes and one cylindrical surface connecting the two side planes. The second type of gash feature for these examples includes two side planes, a bottom plane located between the two side planes, and two cylindrical surfaces connecting the two side planes and the bottom plane, respectively.

Figure 9:
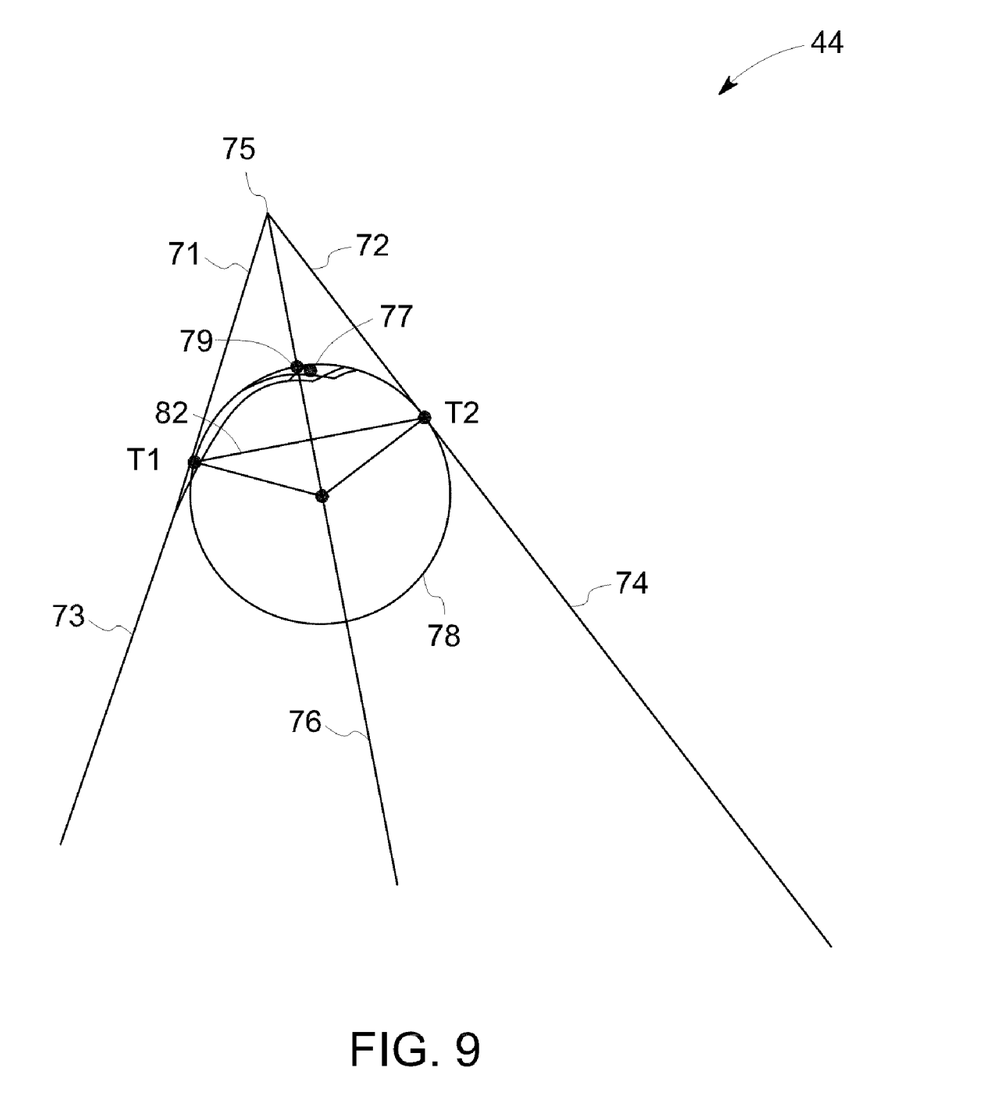
FIG. 9 is a schematic diagram illustrating identification of a first type of gash feature for the example gash section scanning point clouds.
Figure 10:
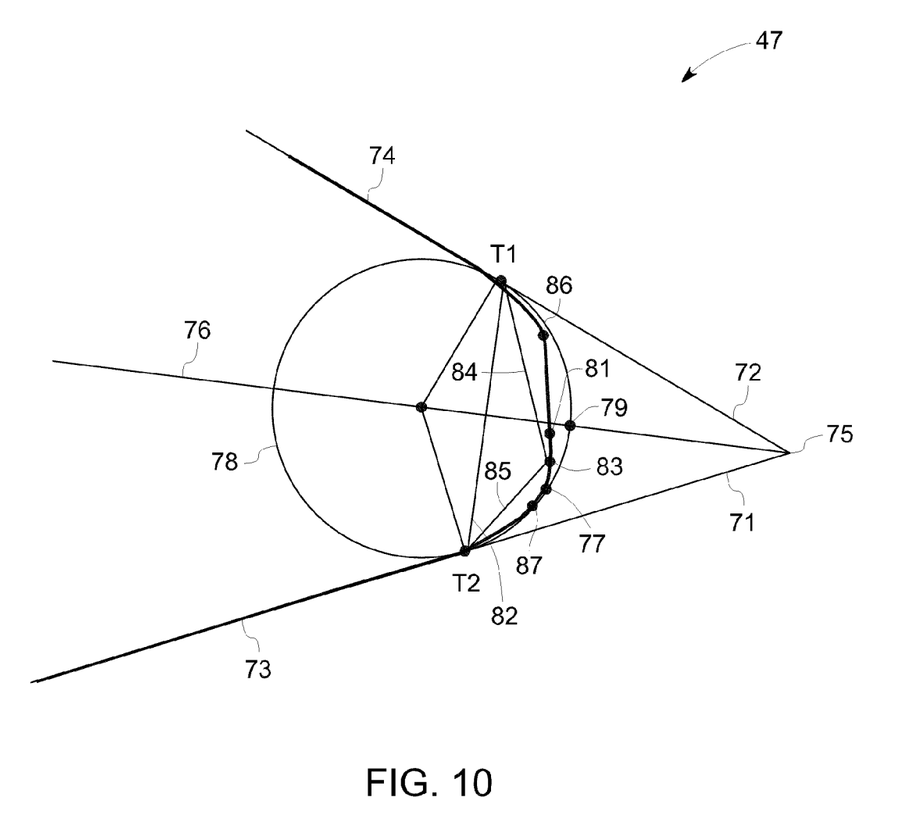
FIG. 10 is a schematic diagram illustrating identification of a second type of gash feature for the example gash section scanning point cloud.

FIGS. 9-10 are schematic diagrams illustrating identification of the types of the gash features. The identification of the gash feature point clouds 44, 47 are taken as examples respectively. It should be noted that the same numerals are used in FIGS. 9 and 10 for ease of illustration. As illustrated in FIG. 9 or FIG. 10, a first sideline 71 and a second sideline 72 are formed on the two sides 73, 74 (which indicate the side planes of the gash feature) of the gash feature point cloud 44 or 47 respectively, and are intersected with each other to form a first intersection point 75. Then, an internal bisector 76 is calculated between the two sides 73, 74, and a point 77 having the first shortest distance from the internal bisector 76 is positioned on the gash feature point cloud 44 or 47. Next, based on the two sides 73, 74 and the first shortest point 77, an inscribed circle 78 tangent to the two sides 73, 74 and passing through the point 77 is detected and has a second intersection point 79 with the internal bisector 76. Subsequently, a point 81 (shown in FIG. 10) having a second shortest distance with the second intersection point 79 may be detected on the gash feature point cloud 44 or 47. Finally, the controller 24 calculates distances between the first shortest point 77 and the second intersection point 79, and between the first shortest point 77 and the second shortest point.

Then, the controller 24 may first analyze whether at least one of the distances between the first shortest point 77 and the second intersection point 79, and between the first shortest point 77 and the second shortest point 81 is below or equal to a corresponding first threshold value predetermined in the controller 24. If one of the distances is below or equal to the corresponding first threshold value, the gash feature may be identified as being the first type, as depicted in FIG. 9. If both of the two distances are larger than respective first respective threshold values and at least one of the two distances is larger than a corresponding second threshold value predetermined in the controller 24, the gash feature may be identified as being the second type, as depicted in FIG. 10.

In certain applications, if the two distances are larger than the respective first threshold values and smaller than the respective second threshold values, since tangent points T1, T2 of the inscribed circle 78 and the two sides 73, 74 can be determined, a first connecting line 82 connecting the tangent points T1, T2 is determined. Then, a first point 83 (shown in FIG. 10) having the first furthest distance from the first connecting line 82 is positioned, so that a bottom part (not labeled) of the gash feature point cloud 44 or 47 is segmented into two segments. In the illustrated embodiment, the bottom part is referred to as an enclosure portion defined by the first connecting line 82 and the gash feature point cloud 44 or 47. Next, as depicted in FIG. 10, the first furthest point 83 and the points T1, T2 are connected respectively to form a second connecting line 84 and a third connecting line 85. Subsequently, a second point 86 and a third point 87 having the second and third furthest distances from the respective first line 84 and second line 85 are detected. The controller 24 determines whether the second and/or third furthest distances are below or equal to respective predetermined values. In non-limiting examples, the tangent points T1, T2 may be or may not be on the gash feature point cloud 44 or 47.

In some examples, if one or two of the second and third furthest distances are not below or equal to the respective threshold value(s), the second point 86 and the point T1, and/or a third point 87 and the point T2 may be connected to form a fourth connecting line and/or a fifth connecting line (not shown). Then, a fourth point and/or a fifth point (not shown) having a fourth and/or fifth furthest distances from the respective fourth and/or fifth connecting lines are detected. The controller 24 determines whether the fourth and/or fifth furthest distances are smaller than or equal to the respective predetermined values. Thus, a similar process may be performed iteratively until such point(s) are detected, whose furthest distance(s) from respective connecting line(s) are below or equal to the respective predetermined value(s). In certain embodiments, the threshold and predetermined values as described above may be experimentally determined.

After such points are detected, in non-limiting examples, such points are assumed to be the second and third points 86, 87. Then, the controller 24 may fit points between the second and third points 86, 87 to form a first fitted line (not shown) and calculate the standard deviation of the first fitted line. In certain applications, if the standard deviation of the first fitted line is acceptable compared to a first experimental value, in certain examples, the controller 24 may further calculate a length of the first fitted line. When the length of the first fitted line is larger than or equal to a certain portion of a length of the bottom part, the gash feature may be identified as being the second type, as depicted in FIG. 10. When the length of the fitted line is below a certain portion of the length of the bottom part, the controller 24 may further fit the points between the second and the third points 86, 87 to form a fitted arc. If the standard deviation of the fitted arc is acceptable, the gash feature may be identified as being the first type, as depicted in FIG. 9. If the standard deviation of the fitted arc is unacceptable compared to a second experimental value, the gash feature may be identified as being the second type, as depicted in FIG. 10.

In other applications, if the standard deviation of the first fitted line is unacceptable compared to the first experimental value, the controller 24 may further fit the points between the second point 86 and the third point 87 to form the fitted arc (not shown). If the standard deviation of the fitted arc is acceptable, the gash feature may be identified as being the first type, as depicted in FIG. 9. If the standard deviation of the fitted arc is unacceptable compared to the second experimental value, the gash feature may be identified as being the second type, as depicted in FIG. 10.

Figure 11:
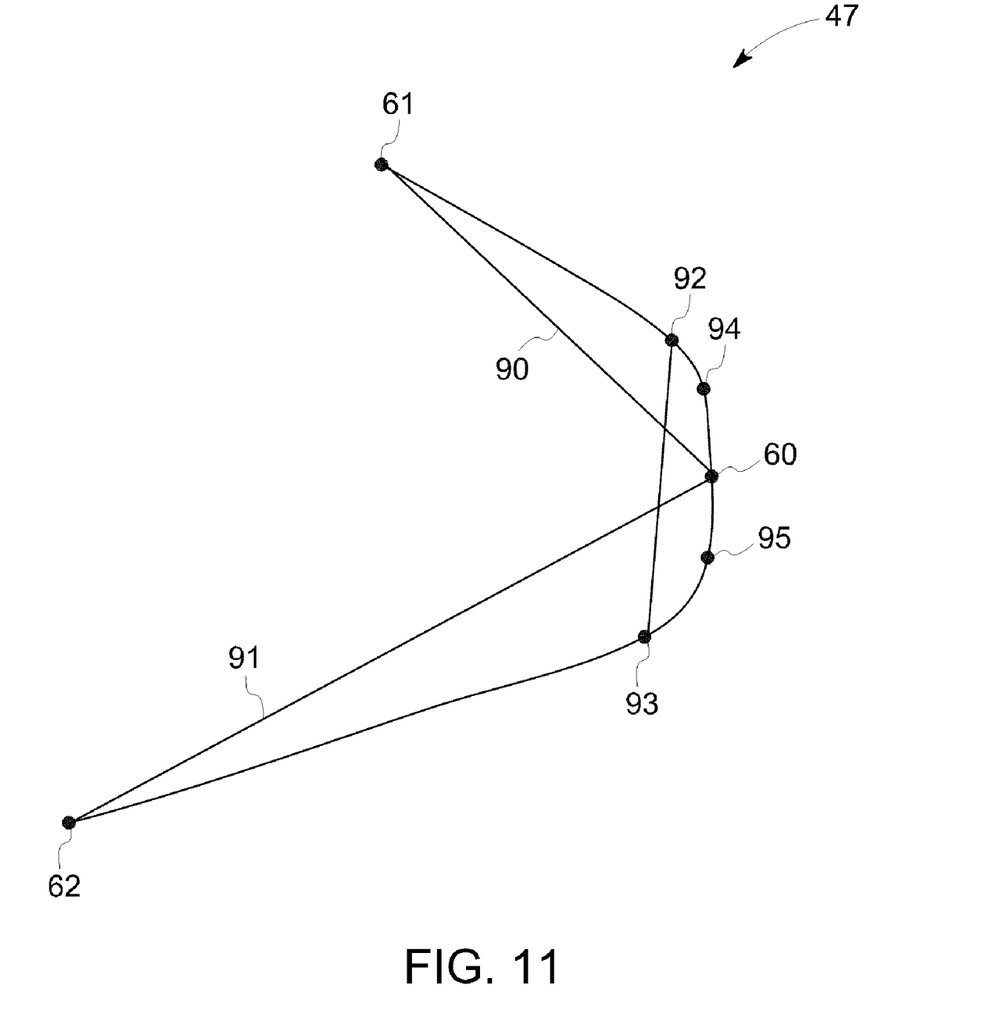
FIG. 11 is a schematic diagram illustrating segmentation of the example second type gash feature shown in FIG. 10.

After the types of the gash features are determined, the controller 24 may segment one or more of the gash feature point clouds 44-47. As depicted in FIG. 11, the second type of the gash feature point cloud 47 is taken for an example. In the illustrated example, the closest point 60 (shown in FIG. 7) is determined, so that the gash feature point cloud is segmented into two segments using the closest point 60. Since the two end points 61, 62 are also detected, a first connection line 90 and a second connection line 91 are formed by connecting the two end points 61, 62 and the closest point 60.

Next, a first distance point 92 and a second distance point 93 having the respective furthest distances from the connection lines 90 and 91 are detected. The controller 24 determines whether the respective furthest distances are below or equal to respective predetermined distance values.

In some cases, one or two of the furthest distances may be not below or equal to respective predetermined values. For example, the distance from the first distance point 92 to the connection line 90 is not below or equal to the corresponding predetermined value. In such cases, the first distance point 92 and the end point 61 may be connected to form a third connection line (not shown). Then, a third distance point (not shown) having a furthest distance from the third connection line is detected. The controller 24 determines whether the distance between the third distance point and the third connection line is below or equal to the predetermined value. In this manner, the process may be performed iteratively until a desired point is detected, whose distance from a corresponding connecting line is below or equal to the predetermined value. Similarly, a desired distance point between the point 60 and the point 61 may also be detected.

After such points (assumed to be the first and second distance points 92, 93 in FIG. 11) are detected, for the example illustrated in FIG. 11, the gash feature point cloud 47 is segmented into three segments using the first and second distance points 92, 93. Similarly, the gash feature point cloud 44 (shown in FIG. 9) may be also segmented into three segments. With respect to the first type of gash feature, such as that shown for the gash feature point cloud 44, the gash parameters may be extracted accordingly based on the segmentation. For example, an angle between the two sides 73, 74 (shown in FIG. 9) may be calculated to retrieve the bottom gash angle of the corresponding gash feature.

In other examples, with respect to the second type of gash feature point cloud 47, the first and second distance points 92, 93 may be connected to form a first connected line (not labeled). Similar to the process for identifying the types of the gash features show in FIGS. 9-10, a point (not shown) having the furthest distance from the first connected line is positioned on the point cloud between the two points 92 and 93, so that the gash feature point cloud between the distance points 92, 93 is segmented into two segments. Next, the point and the points 92, 93 are connected to form two connected lines, respectively. Subsequently, the controller 24 continues to detect points having the furthest distances from the respective connected lines on the gash feature point cloud 47, and determines whether the respective furthest distances are below or equal to respective predetermined threshold values.

Thus, the controller 24 uses a process similar to the process for determining the types of the gash features to determine desired points (partition points), such as points 94, 95, so as to segment the gash feature point cloud 47 therebetween into three sub-segments. Accordingly, the gash feature point cloud 47 is segmented into five segments in terms of the first distance point 92 and the second distance point 93, and the two determined points 94, 95. In some applications, the points between the two desired points may be used to form a line (not shown).

Accordingly, based on the relationship of the five segments of the gash feature point cloud 47, the desired gash parameters may be extracted. For example, the gash width is extracted by calculating the distance between two intersection points of two sidelines 71,72 (shown in FIGS. 9-10) and the line fitted from the points between the two desired points 94, 95.

In certain applications, a 3D (three dimensional) scanning point cloud (not shown) of a cutting tool may be retrieved, which comprises tip scanning point clouds and gash section scanning point clouds. Thus, multiple points may be selected by an user on multiple planes of one or more gash features, which may be determined from the 3D scanning point cloud. Then, the points on the respective planes are used to form lines and/or planes, based upon which the gash parameters may be extracted.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

What is claimed is:

1. A method for extracting gash parameters of a cutting tool, the method comprising:
   positioning the cutting tool on a moveable stage;
   scanning two or more gash sections of the cutting tool to generate two or more gash section scanning point clouds;
   indexing multiple points of the two or more gash section scanning point clouds;
   detecting multiple gash features using the two or more indexed gash section scanning point clouds;
   projecting multiple point clouds of the gash features of the two or more indexed gash section scanning point clouds to form one or more projected gash feature point clouds;
   identifying one or more types of the one or more projected gash feature point clouds;
   segmenting the one or more projected gash feature point clouds based on the type identification; and
   extracting one or more gash parameters based on the segmentation of the one or more projected gash feature point clouds.

2. The method of claim 1, further comprising performing one or more rotary scans of a tip of the cutting tool to generate one or more tip scanning point clouds prior to scanning the two or more gash sections of the cutting tool.

3. The method of claim 1, further comprising preprocessing the two or more gash section scanning point clouds prior to indexing the points of the gash section scanning point clouds.

4. The method of claim 3, wherein preprocessing the gash section scanning point clouds comprises performing one or more of decimating a plurality of points, removing one or more outliers, smoothing, removing a plurality of overlapped points, sorting and re-sampling of the gash section scanning point clouds.

5. The method of claim 1, further comprising segmenting each of the two or more gash section scanning point clouds into a plurality of segments based on a plurality of feature points thereon, wherein the segmenting is performed prior to detecting the gash features of the two or more indexed gash section scanning point clouds.

6. The method of claim 5, wherein the feature points comprise one or more of a plurality of cutting edge points and a plurality of primary relief points.

7. The method of claim 5, wherein detecting a plurality of gash features of the two or more indexed gash section scanning point clouds comprises detecting the closest points from a central point on the respective gash section scanning point clouds in each segment, forming two lines in front of and behind each point located at two sides of each closest point until two end points of each gash feature are determined, and wherein an outer angle between the two lines formed in front of and behind each end point is larger than a threshold value.

8. The method of claim 7, wherein segmenting the one or more projected gash feature point clouds based on the type identification comprises connecting the closest point and the two end points of each of the one or more projected gash feature point clouds to form two respective connection lines, detecting two furthest distance points from the respective connection lines between the closest point and the two end points respectively on each of the one or more projected gash feature point clouds, determining whether the furthest distance of each of the two distance points from the corresponding connection line in each of the one or more projected gash feature point clouds is below a predetermined distance value, and segmenting each of the one or more gash feature point clouds between the closest point and one or two of the end points into two segments if one or more of the furthest distances are below one or more predetermined distance values.

9. The method of claim 8, wherein segmenting the one or more projected gash feature point clouds based on the type identification further comprises repeating connecting one or more of the end points and one or more respective prior detected distance points in each of the one or more gash feature point clouds to form additional one or more connection lines, detecting additional one or more furthest distance points in each of the one or more gash feature point clouds, and determining whether additional one or more furthest distances from the additional one or more furthest distance points to the respective one or more connection lines in each of the one or more gash feature point clouds are below the one or more predetermined distance values until one or more desired furthest distance points are detected if the prior one or more furthest distances are larger than the one or more predetermined distance values, and wherein the one or more furthest distances of the desired one or more furthest distance points from the respective one or more connection lines in each gash feature point cloud are below one or more of the predetermined distance value.

10. The method of claim 9, wherein segmenting the one or more projected gash feature point clouds based on the type identification further comprises segmenting each of the one or more gash feature point clouds between two desired furthest distance points thereon into a plurality of sub-segments.

11. The method of claim 1, wherein projecting a plurality of point clouds of the gash features of the two or more indexed gash section scanning point clouds to form one or more projected gash feature point clouds comprises determining one or more projected lines of the gash features and projecting the point clouds of the gash features along the one or more projected lines to form one or more projected gash feature point clouds.

12. The method of claim 11, wherein the one or more projected lines are rotated to be parallel to an axial line of the cutting tool respectively to facilitate the extraction of the gash parameters.

13. The method of claim 11, wherein identifying one or more types of the one or more projected gash feature point clouds comprises forming two sidelines on two sides of each of the one or more projected gash feature point clouds, detecting an internal bisector between the two sidelines of each projected gash feature point cloud, positioning a first shortest point from the internal bisector on each projected gash feature point cloud, detecting an inscribed circle to intersect an intersection point with the internal bisector on each projected gash feature point cloud, positioning a second shortest point from the intersection point on each projected gash feature point cloud, and calculating distances between the first shortest point and the intersection point, and between the first shortest point and the second shortest point on each projected gash feature point cloud.

14. The method of claim 13, wherein the projected gash feature point cloud comprises a first type gash feature if at least one of the distances is below a first threshold value.

15. The method of claim 13, wherein the projected gash feature point cloud comprises a second type gash feature when both of the two distances are larger than respective first threshold values and at least one of the two distances is larger than a second threshold value.

16. A system for extracting gash parameters of a cutting tool, the system comprising:
a stage configured to position the cutting tool;
a range sensor configured to scan the cutting tool; and
a controller configured to:
control the range sensor to scan two or more gash sections of the cutting tool to generate two or more gash section scanning point clouds,
index multiple points of the two or more gash section scanning point clouds,
detect multiple gash features using the two or more indexed gash section scanning point clouds,
project multiple point clouds of the gash features of the two or more indexed gash section scanning point clouds to form one or more projected gash feature point clouds,
identify one or more types of the one or more projected gash feature point clouds,
segment the one or more projected gash feature point clouds based on the type identification, and
extract one or more gash parameters based on the segmentation of the one or more projected gash feature point clouds.

17. The system of claim 16, wherein the controller is further configured to control the range sensor to perform one or more rotary scans of a tip of the cutting tool for facilitating the scannings of the two or more gash sections.

18. The system of claim 16, wherein the controller is further configured to process the two or more gash section scanning point clouds prior to indexing the points of the gash section scanning point clouds.

19. The system of claim 16, wherein the controller is further configured to segment each of the two or more gash section scanning point clouds into a plurality of segments based on a plurality of feature points thereon prior to detecting the gash features of the two or more indexed gash section scanning point clouds.

20. The system of claim 16, wherein the controller is further configured to detect the closest points from a central point on the respective gash section scanning point clouds in each segment, and to form two lines in front of and behind each point located at two sides of each closest point until two end points of each gash feature are determined to detect the gash features, and wherein an outer angle between the two lines formed behind and in front of each end point respectively is larger than a threshold value.

* * * * *